United States Patent
Ragsdale-Elliott et al.

(10) Patent No.: US 6,636,835 B2
(45) Date of Patent: Oct. 21, 2003

(54) WIRELESS MAITRE D' SYSTEM FOR RESTAURANTS

(75) Inventors: Deloris Ragsdale-Elliott, Cincinnati, OH (US); Demeatres Kindell, Cincinnati, OH (US); Deborah A. Robinson, Cincinnati, OH (US)

(73) Assignee: 3DE Innovations, Cincinnati, OH (US)

( * ) Notice: Subject to any disclaimer, the term of this patent is extended or adjusted under 35 U.S.C. 154(b) by 153 days.

(21) Appl. No.: 09/824,719

(22) Filed: Apr. 4, 2001

(65) Prior Publication Data

US 2002/0147647 A1 Oct. 10, 2002

(51) Int. Cl.$^7$ ................................................ G06F 17/60
(52) U.S. Cl. ................................. 705/15; 705/16; 705/26
(58) Field of Search ............................... 705/15, 16, 26

(56) References Cited

U.S. PATENT DOCUMENTS

| | | | |
|---|---|---|---|
| 4,530,067 A | | 7/1985 | Dorr |
| 4,569,421 A | * | 2/1986 | Sandstedt ................ 186/39 |
| 4,722,053 A | * | 1/1988 | Dubno et al. ............. 364/401 |
| 5,699,039 A | | 12/1997 | Korzen |
| 5,838,798 A | | 11/1998 | Stevens, III |
| 5,839,115 A | | 11/1998 | Coleman |
| 5,845,263 A | | 12/1998 | Camaisa et al. |
| 5,907,275 A | | 5/1999 | Battitini et al. |
| 6,208,976 B1 | * | 3/2001 | Kinebuchi et al. .......... 705/15 |
| 6,366,196 B1 | * | 4/2002 | Green et al. ............ 340/286.09 |

FOREIGN PATENT DOCUMENTS

| | | | |
|---|---|---|---|
| WO | WO 8304327 | | 12/1983 |
| WO | WO 99/48034 | | 9/1999 |

OTHER PUBLICATIONS

WorldCom, Basic and Enhanced Paging Services, Feb. 16, 2001, pp. 1–2, 2.
WorldCom, Quick Reply Interactiv Paging, Feb. 16, 2001, pp. 1–3.
AT&T Wireles: Messaging Service for paging, Feb. 16, 2001, pp. 1–2.
Krakow, Gary: MSNBC Technology: Microsoft invades the airwaves, Introducing smart cellular phones Stinger and stirling. Feb. 20, 2001, pp. 1–5.

* cited by examiner

Primary Examiner—Kenneth R. Rice
Assistant Examiner—Christopher Buchanan
(74) Attorney, Agent, or Firm—Richard C. Litman

(57) ABSTRACT

A wireless maitre d' system and method for providing interactive two-way communication between patrons and restaurant service personnel who have direct interaction with the patrons during restaurant encounters. The wireless maitre d' system includes a first wireless device and a second wireless device. The first wireless device establishes an interactive two-way electronic communication between at least one patron and at least one restaurant service personnel by a wireless communication link, and the at least one restaurant service personnel directly interacts with the at least one patron during a restaurant encounter. The second wireless device engages in the interactive two-way communication between the at least one service personnel and the at least one patron by the wireless communication link. The interactive two-way electronic communication includes an order for a retail item from the at least one patron to the at least one restaurant service personnel.

20 Claims, 8 Drawing Sheets

WIRELESS MAITRE D' SYSTEM FOR RESTAURANTS

BACKGROUND OF THE INVENTION

1. Field of the Invention

The present invention relates generally to restaurant management systems. More specifically, the invention is directed to a wireless maitre d' system and method for expeditiously receiving, filling and finalizing patron orders in and outside of restaurants.

2. Description of the Related Art

A number of restaurant management systems have been employed which utilize on-line or computer-based control methods for controlling orders and product inventory for both fast food and fine dining restaurant settings. As described hereinbelow, conventional methods have sought to improve direct communication between the waiter/waitress and the chef or short order cook with the use of remote devices. However, there has been little or no significant improvements that link direct electronic communication between a customer, waiter/waitress and the food preparer which minimize delays in the normal course of resolving menu orders taken by a waiter/waitress from a patron. With the rise in health related ailments (eg. diabetes, coronary heart disease, etc.) in the United States, it has become increasingly important to ensure that customer's food orders have been effectively communicated and properly prepared to maximize the wonderful experience of eating or dining out. In this day and age, it is sad to say that people who choose to eat in restaurants have become more frustrated by the inefficiency of waiter/waitress service more than any other problematic factors encountered in a restaurant. Unfortunately, it must be said that the wonderful experience of enjoying a well prepared meal has often been marred by degenerative waiter/waitress assistance or a lack thereof. It is out of this type of customer-waiter/waitress relationship that most patrons file complaints.

Current research in this area has indicated, particularly for the next millennium that the primary focus of concern for restaurants and/or for businesses in general will be customer satisfaction. To this end, it is the impetus of the present invention to alleviate the aforementioned problems by providing a wireless maitre d' system and method which allows interactive two-way electronic communication between selective or roaming restaurant personnel and at least one local or remote patron without the need for unnecessary physical exertion and/or frustration at the expense of either the customer or waiter/waitress due to an inherent deficiency in the conventional restaurant management methods, at least as noted below.

For example, U.S. Pat. No. 4,530,067 issued to Dorr discloses a method and apparatus for managing information and the control of restaurants. The apparatus includes a plurality of remote units carried by waiters. The remote units are equipped with a keyboard, a display and a memory source with radio transmission and receiving capability. A central interrogator transceiver periodically interrogates each of the remote units after which the remote units transmit information back to the central interrogator. The central interrogator transceiver couples the information transmitted thereto to a central processor with high speed memory.

The processor operates on the information received to provide order information to a kitchen display, an order assembly display, a service bar display, a table status display and to a check printer-cash register. The order information is coupled to an inventory control unit for decrementing the various items in inventory by the quantity of items ordered by each customer. However, this system directly omits the customer within this link of communication.

U.S. Pat. No. 5,699,039 issued to Korzen discloses an electronic table pager and display device comprising a menu stand which includes a call activation switch for summoning a server to a table in a restaurant. The device includes a housing having a base that supports a low energy light source therein. When a patron wants to summon a waiter, that patron actuates a simple membrane switch which provides a modulated output signal to the light source via an inverter circuit, so that the light source emits light pulses to attract and summon a waiter to the table. Such systems requires visual eye contact with the illuminated device, which in most instances becomes ineffective because the waiter/waitress is preoccupied or not properly positioned for identifying the visual signal. Also, it has been found that such use of light sources have been improperly installed or do not compensate for the range of heights of the waiter/waitress thereby preventing effective visibility of an illuminated light signal.

U.S. Pat. No. 5,838,798 issued to Stevens, III discloses a restaurant transaction processing system which employs low cost cordless phone transceivers to transmit orders. A server having a first cordless telephone transceiver receives data from a portable computer via a second cordless telephone transceiver. The first and second cordless transceivers operate at FCC designated transmission frequencies for a range within less than five thousand feet. A typical frequency of operation is in a frequency band near 900 MHz.

U.S. Pat. No. 5,839,115 issued to Coleman discloses a restaurant management system which monitors inventory sent to a user from a supplier. Each item in the order has an associated minimum time until the order may be delivered. A renumeration system is used to collect money in response to the receipt of an order. An associated alarm with selective thresholds are used to indicate a predetermined duration of time from the receipt of an order to actual delivery. Software features of the system include food, beverage and table selections with payment options on line. However, there is no direct electronic link for communication between the waiter/waitress and customer.

U.S. Pat. No. 5,845,263 issued to Camaisa et al. discloses an interactive visual ordering system and method which uses full-color images. The system is used to facilitate menu orders by a customer utilizing a personal computer system with user data input made via a conventional keyboard device. When the customer decides to order a particular menu item, the system captures the ordered items and tabulates a running bill. The pay options include credit and/or debit transactions, but excludes wireless waiter/waitress to customer order resolution. Touch screen activation of orders are made according to this system, and is incorporated herein by reference.

U.S. Pat. No. 5,907,275 issued to Battistini et al. discloses an order communication system which allows audiovisual interactive communication between a customer at a remote and fixed order station, and an attendant receiving orders in a restaurant. The order communication system allows display programming in the form of textual and graphical depictions, with two-way live video of both the attendant and customer at fixed stationary points as a fast food drive-thru system.

The PCT document (WO 83/04327) by Pitroda discloses a restaurant system for processing, controlling and displaying order information received via a one-way signal transmitting terminal located in a remote area. Other conventional features of general relevance to the wireless maitre d' system and method as herein described are those disclosed in the published PCT application (WO 99/48034) by Michot. Michot teaches a method and device for making automatic payments of a selective or group of items. The method consists of assigning to each consumer a transponder module having an identification code representative of an account balance stored therein, and subtracting the price of a picked or selected item thereby providing an updated balance for the consumer at product dispensing points.

None of the above inventions and patents, taken either singularly or in combination, is seen to describe the instant invention as claimed. Thus, a wireless maitre d' system for restaurants solving the aforementioned problems is desired.

SUMMARY OF THE INVENTION

The wireless maitre d' system and method according to the invention provides independent touch screen visual ordering and remote pager signalling of a waiter/waitress for expediting and resolving menu orders made by patrons via 2-way interactive wireless communication. The waiter/waitress is equipped with a hand-held palm size pager unit with multi-line scrolling and buffer capabilities to send and receive messages. The wireless pager device is adapted to fit, clip or attach to a clothing article or to the wrist of a server for hands-free use. The hand-held pager is programmed to provide a specific restaurant menu with mirrored effects stored on a personal computer system which accessed by a customer via a touch screen activation terminal located at a patron's table. Customer input data is compiled and interpreted to generate statistical or demographic data of patrons based on (1) age, (2) sex, (3) race, (4) social economic, and other factors pertinent for improving restaurant services. Data obtained from on-line Customer service surveys are also compiled for advertising, marketing and for further improving customer service. Other selective screen features include advertisement for businesses, catering services, food preparations for parties, Job announcements, health and food related Trivia, card games, including a link for on-line Internet surfing. In augmented form, the maitre d' system and method is accessed as a stand alone kiosk which has the advantage of attracting tourist and the like to assist in providing restaurant information without having to interact directly with restaurant personnel. The kiosk system allows the user to review menu items linked to caloric expenditure data and health related information approved by the American Heart Association (AHA) and the American Diabetic Association (ADA). Each menu item is also linked with an organ symbol (i.e. heart, kidney, etc.) for quickly providing a potential customer with a menu and/or restaurant which benefits personal dietary and/or seating needs, respectively. Both local and remote orders are filled by customers via web enabled devices which directly link local customers and restaurant personnel within a single line of communication.

Accordingly, it is a principal object of the invention to provide a wireless maitre d' system and method which allows interactive two-way communication to selective restaurant personnel for expeditiously receiving, filling and finalizing patron orders in and outside of restaurants.

It is another object of the invention to provide a wireless maitre d' system and method which allows 2-way electronic interactive communication between a customer and at least one restaurant personnel or server.

It is a further object of the invention to provide a maitre d' system and method which accommodate health related menu selections as approved by AHA and ADA.

Still another object of the invention is to provide a maitre d' system and method which allows electronic transmission of orders form either a customer table and/or via a maitre d' paging unit.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 7A is a conventional world-wide-web based interactive paging feature by WORLDCOM for remotely accessing the wireless maitre d' system with text and numeric messages.

FIG. 7B is a conventional world-wide-web based interactive paging feature by WORLDCOM for paging a remote or absent patron during the ordering process.

Similar reference characters denote corresponding features consistently throughout the attached drawings.

DETAILED DESCRIPTION OF THE PREFERRED EMBODIMENTS

The present invention is directed to a wireless maitre d' system and method for providing independent touch screen visual ordering and remote pager signaling of a waiter/waitress in and outside of restaurants. The system is used for expediting and resolving menu orders made by patrons via 2-way interactive wireless communication with at least one restaurant employee. The preferred embodiments of the invention are depicted in FIGS. 1–7, and are generally referenced by numerals 8 and 9, respectively.

Figure 1:
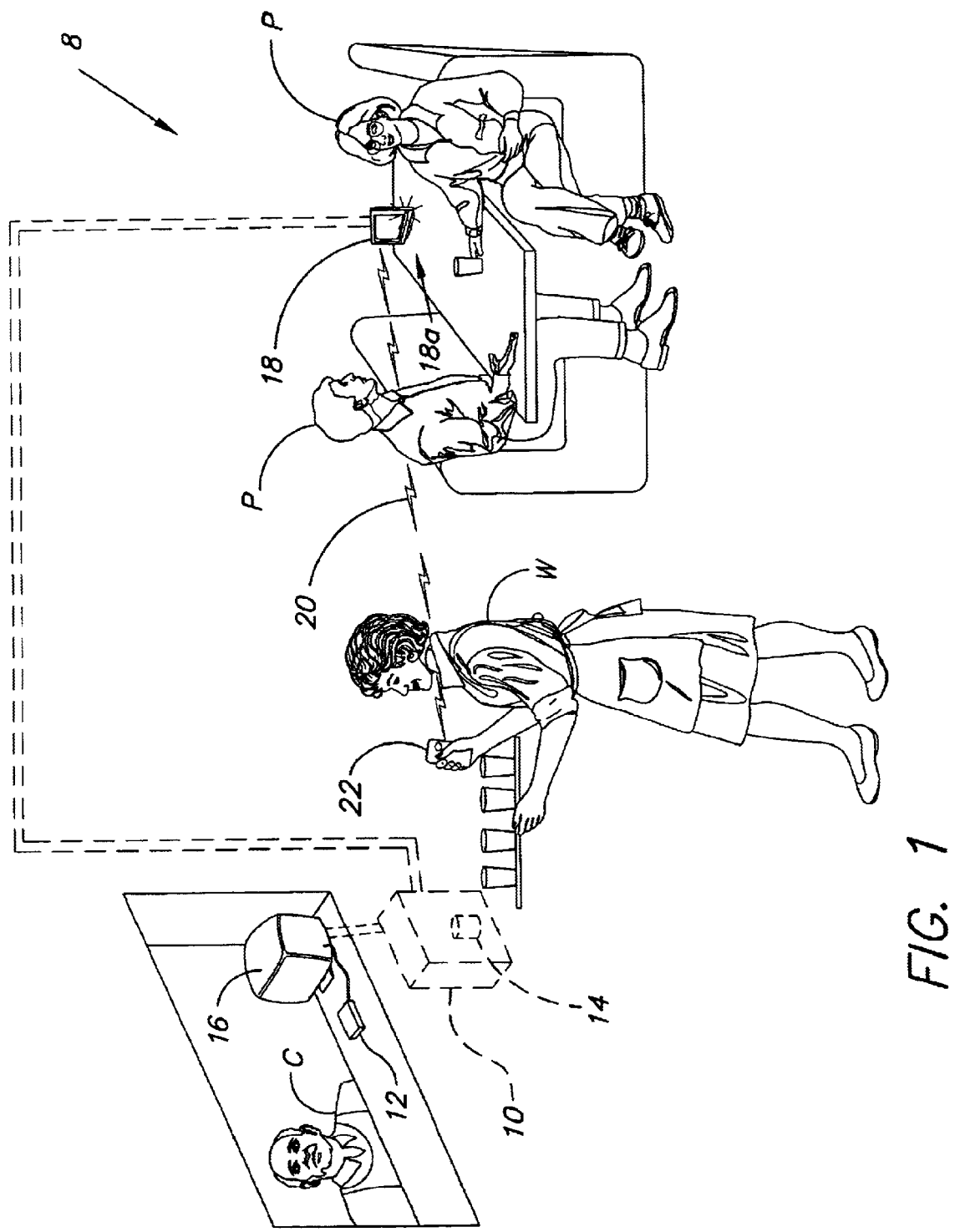
FIG. 1 is an environmental, perspective view of a wireless maitre d' system and method according to the present invention.

As diagrammatically illustrated in FIG. 1, the maitre d' system 8 is shown comprising a computer 10 having a wireless transmitter or transceiver 12 electronically connected thereto, at least one interior data storage means 14, at least one video monitor 16 electrically connected to the computer 10 and a computer readable software system or computer code operatively stored therein for manipulating programs processed by computer processors (ranging from low end Pentium class processors starting at processing speeds of 133 MHz up to processor speeds provided by later model Intel Pentium II, III, IV, etc. chips including compatible AMD series processors such as the Athlon central processing unit (cpu) operating near speeds of up to and over 1 GHz with equivalent modem compatibility), and a data storage facility which includes random and cache access memory at least for selective optimum data or software transfer between computer related devices. Numerous software utilities are currently available for improving or boosting on-line world wide web and/or Internet access and data transmission speed for various computer systems (eg. InternetBOOST application software). While not discussed in detail, these software features are well within the knowledge of one having ordinary skill in the relevant art, and could be easily incorporated to provide speed enhancing features accordingly.

In this regard, the readable code means or software can include UNIX based programming or Windows 3.x, 95, 98, 2000 and/or NT system software which accommodate internet browser software such as NETSCAPE™ and Internet Explorer to include HTML, JavaScript and other related programming designed for enhanced visual graphics. The lower end personal computer software systems will enable start-up restaurant businesses or the like to transition into the maitre d' system as herein described without the need for extensive capital improvements or investments. Thus, the system improvements to conventional restaurant ordering systems includes the use of a first touch screen monitor 18 which displays menu driven software by a visual set of images linked to preselected food or product menu items according to a specific restaurant cuisine or product line. Such, image data can be obtained by original photo-images made by the restaurant owner or the like to represent a selective set of menu items or can be scanned or digitally transferred to a database and/or downloaded/uploaded from an authorized internet or other image database for linking to a selective menu item or set of items thereof.

The menu driven system is electrically connected to a central computer or server 10, which includes touch screen activated images which operatively provide direct links to Internet applications or related software programs (eg. on-line paging via MCI: having a URL of http://www.worldcom.com/usa_products/wireless/paging/ or AT&T Wireless: http://www.mobile.att.net/mc/personal/pager_show.html to enable a patron to transmit an electronically coded signal or message 20 via the computer 10, to at least one 2-way interactive device or means 22, namely a pager, web enabled cell phone or SENDO Pocket PC by Microsoft. These devices could include conference calling to include any number or plurality of users. As illustrated in FIG. 1, a waiter W or geographically remote client or user U possessing a 2-way interactive device would receive the message 20. The transmitted signal 20 can be a numeric and/or alphanumeric message signal readable by compatible software which digitally stores the received transmitted data or signal 20 as accessible computer data for digital manipulation, processing, and/or subsequent wireless transmission for 2-way interactive communication. A waitress/waiter W equipped with a hand-held palm size pager unit 22 with multi-line scrolling and buffer capabilities for sending and receiving 2-way interactive electronic messages would forward a received message to the chef or short order cook C via wireless transceiver 12 electrically connected to the computer 10 or reply to a respective patron P via a selective touch screen terminal 18 having a 2-way speaker 18a configured for direct voice messaging. A plurality of such terminals 18 can be selectively placed at various table and seating areas for enabling corresponding communication with a selective waiter/waitress W having a pager unit 22 configured for receiving wireless messages from a select group of patrons per table or per group of tables. That is, each pager device 22 can be regionally coded within a restaurant to receive messages from a select group of tables or corresponding patrons, respectively.

The wireless pager device 22 is adapted to fit, clip or attach to a clothing article or to the wrist of a server W for hands-free use. The hand-held pager 10 is preferably an approved Motorola F1500 or similar device which includes FLEX™ technology for improved page reliability. Other features of the device will include:

Confirmed message delivery which helps to ensure that a user never miss a page;

Large Screen Optimax EL™ Electra light display for easy readability and exceptional clarity;

Automatic message correction;

Folder-based system to manage messages;

Four-line high resolution display;

Variable audible or musical alerts;

Battery Gauge with a Low Battery indicator.

While these particular features provide enhanced paging for 2-way interactive paging, each pager 22 is programmed to provide specific restaurant menu items with similar program features stored on a personal computer system which is accessed by a customer or patron P, via the touch screen activation terminal 18 located at a patron's table. The touch screen 18 provides a means by which wireless messages 20 (either numeric or alphanumeric, including voice messages 20a) are sent to a waiter W via the remote device 22, which in turn serves as a second means by which a received signal from either a patron, chef, or other user having access thereto is read or heard and a wireless response generated, respectively.

Figure 3:
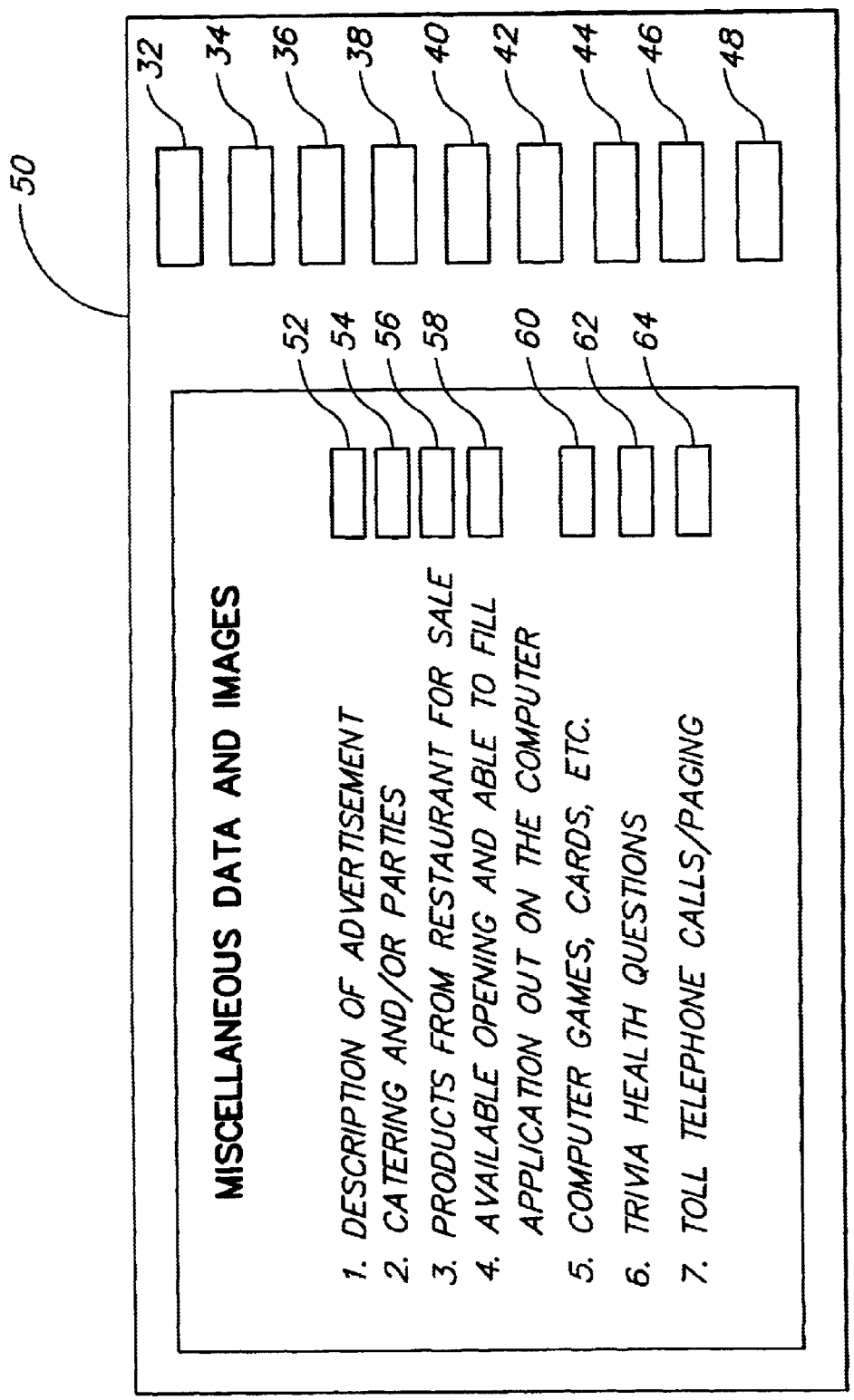
FIG. 3 is an exemplary Miscellaneous Data and Images display, illustrating a variety of miscellaneous information from paid advertisements to patron toll telephone calling and paging according to the invention.
Figure 4:
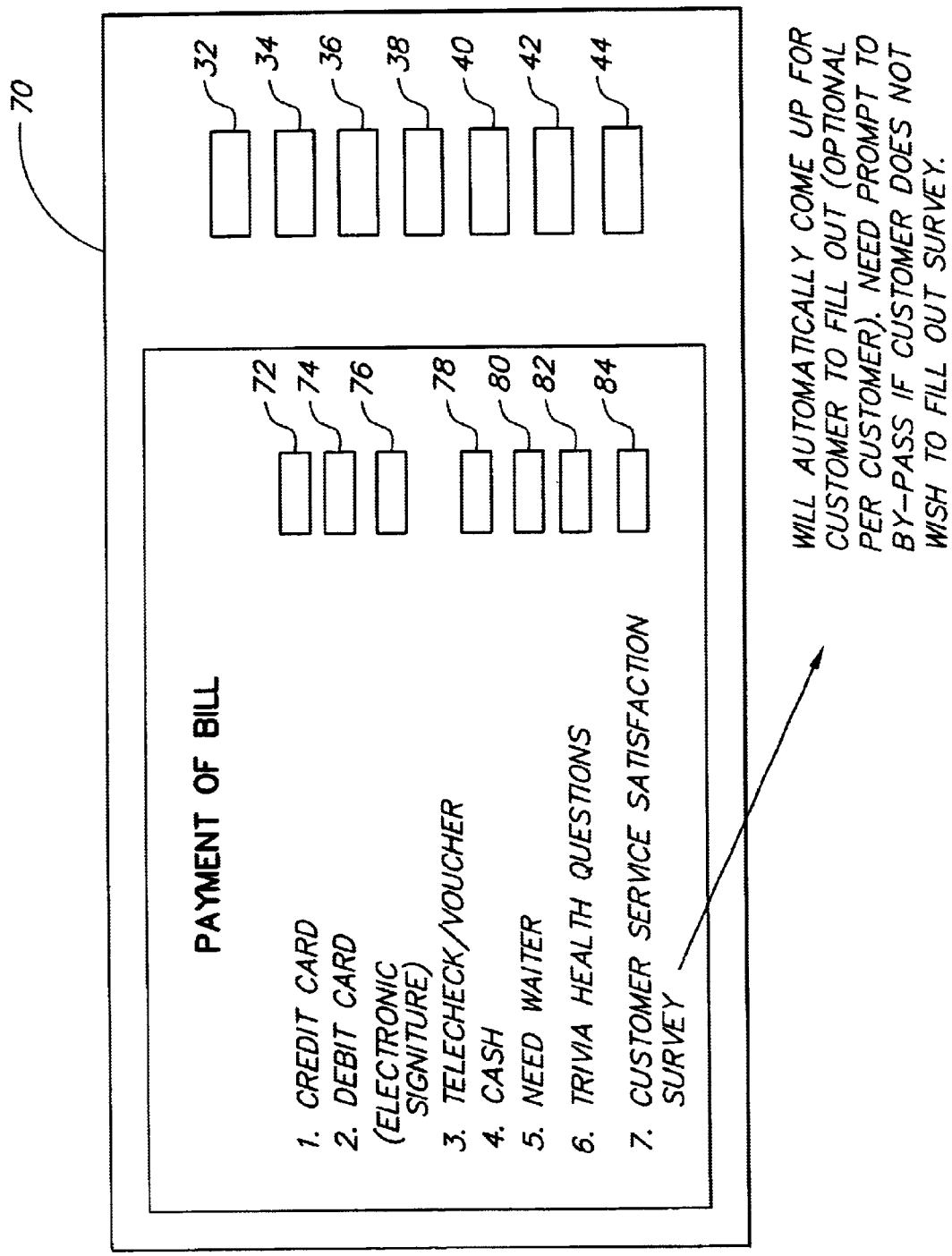
FIG. 4 is an exemplary Payment of Bill display, illustrating payment options and customer surveys according to the invention.

The terminal 18 can be configured with an input device such as a magnetic strip reader or scanner disposed on an external surface of the screen to receive credit card, bank card, etc. information as a customer payment option. This feature, can also include the use of electronic signature apparatus in conjunction with the magnetic strip reader or a telecheck system. Notwithstanding, the preferred embodiment of the method 9 for providing independent touch screen visual ordering and remote pager signalling of a waiter/waitress, in and outside of restaurants includes software driven customer inputs which utilize a conventional software digital keyboard for inputting customer data in select menu driven fields. Exemplary menu features are illustrated in FIGS. 2–4, and are further described below.

Figure 2:
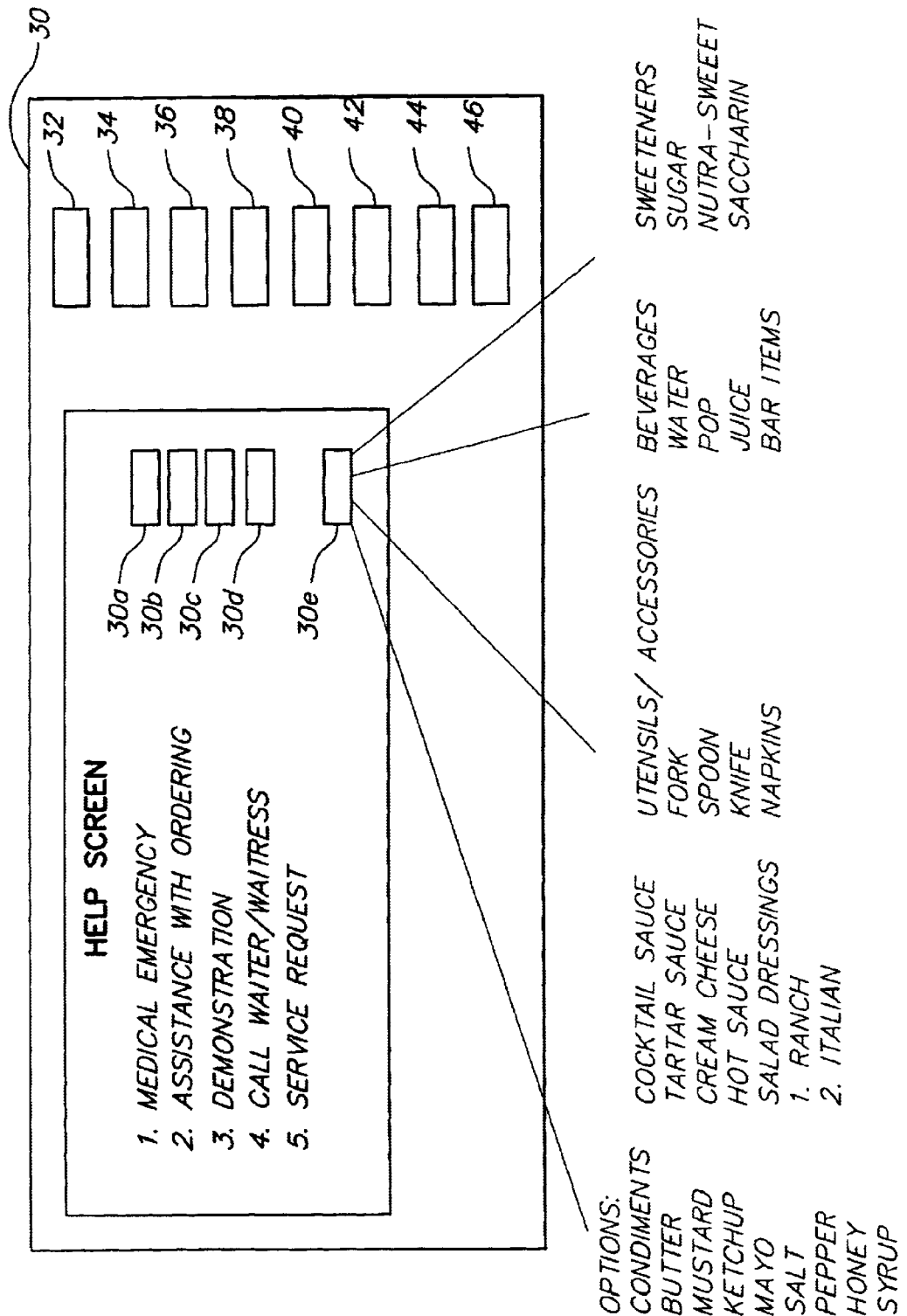
FIG. 2 is an exemplary Help Screen display, illustrating the types of on-line help that may be available per menu item while ordering according to the invention.

As depicted in FIG. 2, a help menu 30 is shown as an elemental and exemplary feature of the maitre d' method 9, wherein a patron(s) has the option of activating the menu 30 by selectively touching a location 30a, 30b, 30c, 30d and 30e which alerts a waiter/waitress of a medical emergency, assistance with ordering, the need for a software demonstration, assistance and a service request or need, respectively. Each help menu item has direct links to a toll call/paging system which provides calls for 911 emergencies or selected needs. As shown in more detail, the service request touch location 30e, shows several options which include the selection of the following items:

a. Condiments—such as butter, mustard, ketchup, mayonnaise, salt, pepper, honey, syrup, jelly, cocktail sauce, tartar sauce, cream cheese hot sauce and salad dressings (i.e. ranch, italian, etc.)

b. Utensils/Accessories—such as forks, spoons, knives, napkins, towlettes, etc.

c. Beverages—such as water, pop, juice, bar items, etc.

d. Sweeteners—such as sugar, nutra-sweet, saccharin, equal, etc. Other items can be added to the inventory list as based on demand. The outer touch locations 32, 34, 36, 38, 40, 42, 44 and 46 are standard menu touch location programmed to allow a user navigate back and forth thru the menu system as desired. That is, next 32—displays the next menu, previous 34—displays moves a previous menu in sequence or incremental sequence steps per menu, view advertisements 36, select menu 38, help 40, caloric information 42, add to order 44 and display order 46.

As depicted in FIG. 3, a miscellaneous data and images menu 50 is shown as an elemental and exemplary feature of the maitre d' system and method 9, wherein a patron(s) has the option of activating the menu 50 by selectively touching a location 52, 54, 56, 58, 60, 62 and 64 for viewing advertisement descriptions, catering and/or party information, products on sale by the restaurant, on-line job opening and applications, computer games, cards, etc., trivia on health related matters and making toll telephone calls/pages, respectively. Similarly, the outer touch locations 32, 34, 36, 38, 40, 42, 44 and 46 are standard menu touch locations programmed to allow a user to navigate back and forth thru the menu system as recited above. An optional element 48 has been added as an automatic log out feature.

As depicted in FIG. 4, a payment of bill menu 70 is shown as an elemental and exemplary feature of the maitre d' system and method 9, wherein a patron(s) has the option of activating the menu 70 by selectively touching a location 72, 74, 76, 78, 80, 82 and 84 for processing menu order payments via credit card, debit card, telecheck or voucher, by cash, with waiter or maitre d' and reviewing trivia or filling out an on-line customer satisfaction survey, respectively. As noted, the customer satisfaction survey 84 will automatically come up for the patron P to fill out or prompt to by-pass prior to check out. Payment confirmation can be received by electronic signature or receipt or by receiving an actual hard copy or paper receipt from the waiter/waitress. This particular feature provides central processing for the restaurant, however each touch screen unit can be made to dispense a paper receipt as conventionally performed in electronic self serve electronic transaction stations (eg. gas stations, etc.). As in FIG. 2, all menus as exemplary described for FIGS. 3 and 4 will include the outer touch locations 32, 34, 36, 38, 40, 42, 44 and 46 as standard menu touch locations programmed to allow a user to navigate back and forth thru the menu system, accordingly.

Figure 5A:
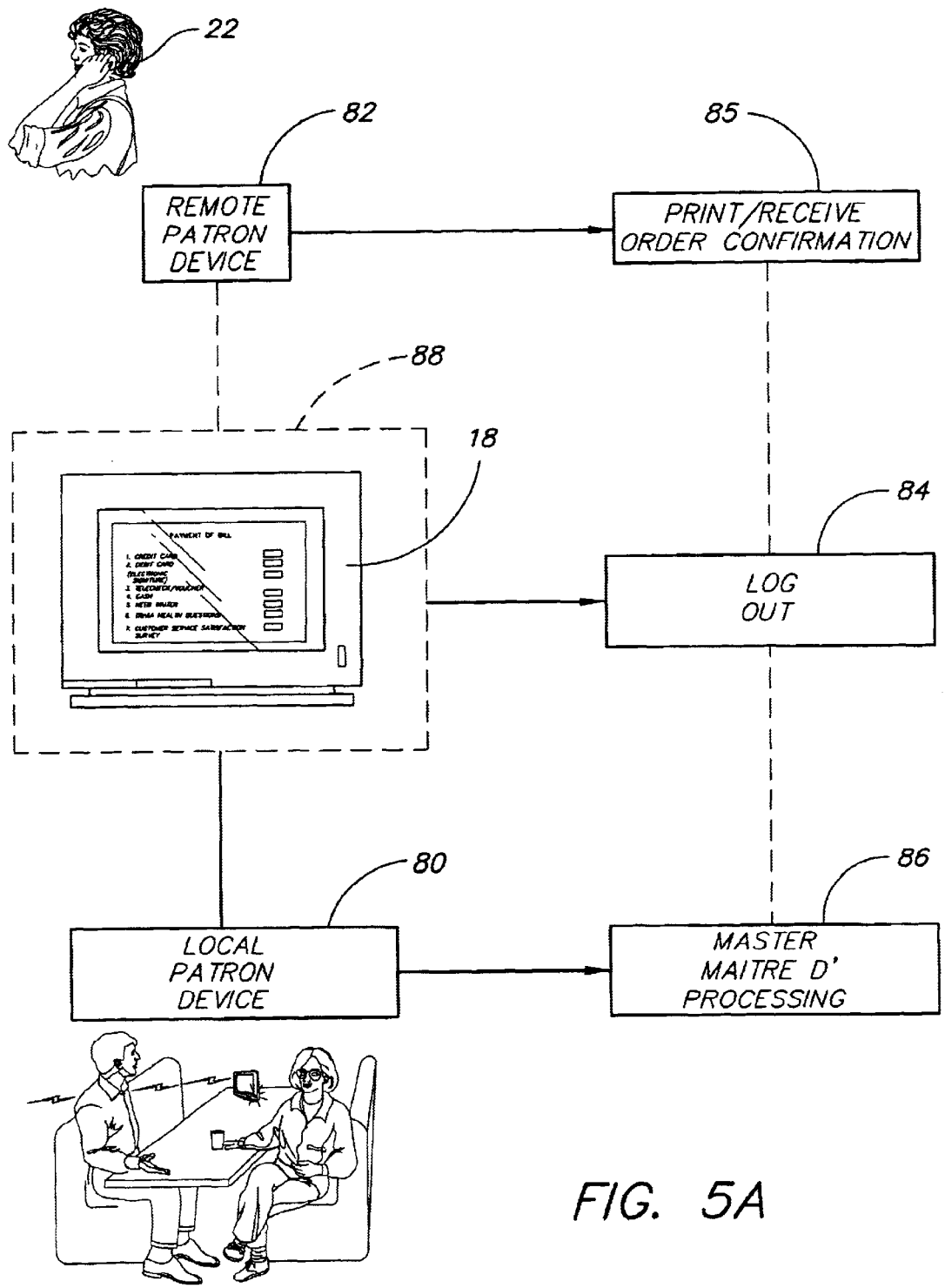
FIG. 5A is a block diagram of an exemplary hardware component with input and output processing of the wireless maitre d' system according to the invention. audio

As diagrammatically illustrated in FIG. 5A, the maitre d' system and method is shown illustrating local 80 and geographically, remote 82 2-way interactive communication between the patron P and at least one restaurant personnel W and between a patron P and a remote user U possessing a 2-way interactive device 22 (i.e. pager, web enabled cell phone or SENDO Pocket PC), respectively. The inherent calling features of the maitre d' system and method allows local patrons the option to make toll calls or pages directly to friends, relatives, etc. This particular option can be converted to a marketing strategy to attract customers by offering free internet access toll free calling/paging. The remote patron can also dial into the maitre d' system as depicted by touch screen terminal 18 to place orders with similar log out 84 and order payment processing 85, except that the local patron P has the advantage of waiter/waitress assistance 86 and the remote patron has only an electronic confirmation number or voucher given over the web enable device 22, until final pickup by the remote patron or delivery by the restaurant. Accordingly, other data can be given such as requests for delivery or time of arrival of the remote patron P to fill orders.

This includes the feature wherein a local patron can make a direct order for the remote patron by telephone or message sent via page to by-pass remote ordering procedures. Another embodiment of the invention as illustrated by the dotted lines is that the maitre d' system is configured as a stand alone portable kiosk or fixed drive thru touch activated ordering screen 88. This stand alone system 88 includes wherein the menu driven touch screen 18 comprises a menu program such as computer-executable instructions of compiled $C^{++}$, and/or Visual Basic language code resident in memory 14 with the computer 10 which allows roaming potential patrons to make visual orders and selectively send messages and view promotional information. This system 88 will serve as a primary function of attracting roaming patrons and for providing menu orders discounts and/or vouchers therefrom.

In a similar way, the kiosk system 88 will not only provide a menu program driven by a set of selective photo-realistic images digitally accessible via the storage means 14 of the computer 10, but it will also include an augmented program of readable source code which allows a user to interactively review menu items linked to caloric expenditure data and health related information. The data and information will be interactively linked to an organ symbol (such as a heart, kidney, etc.) for visually indicating menu items recommended and approved for related health problems.

Figure 5B:
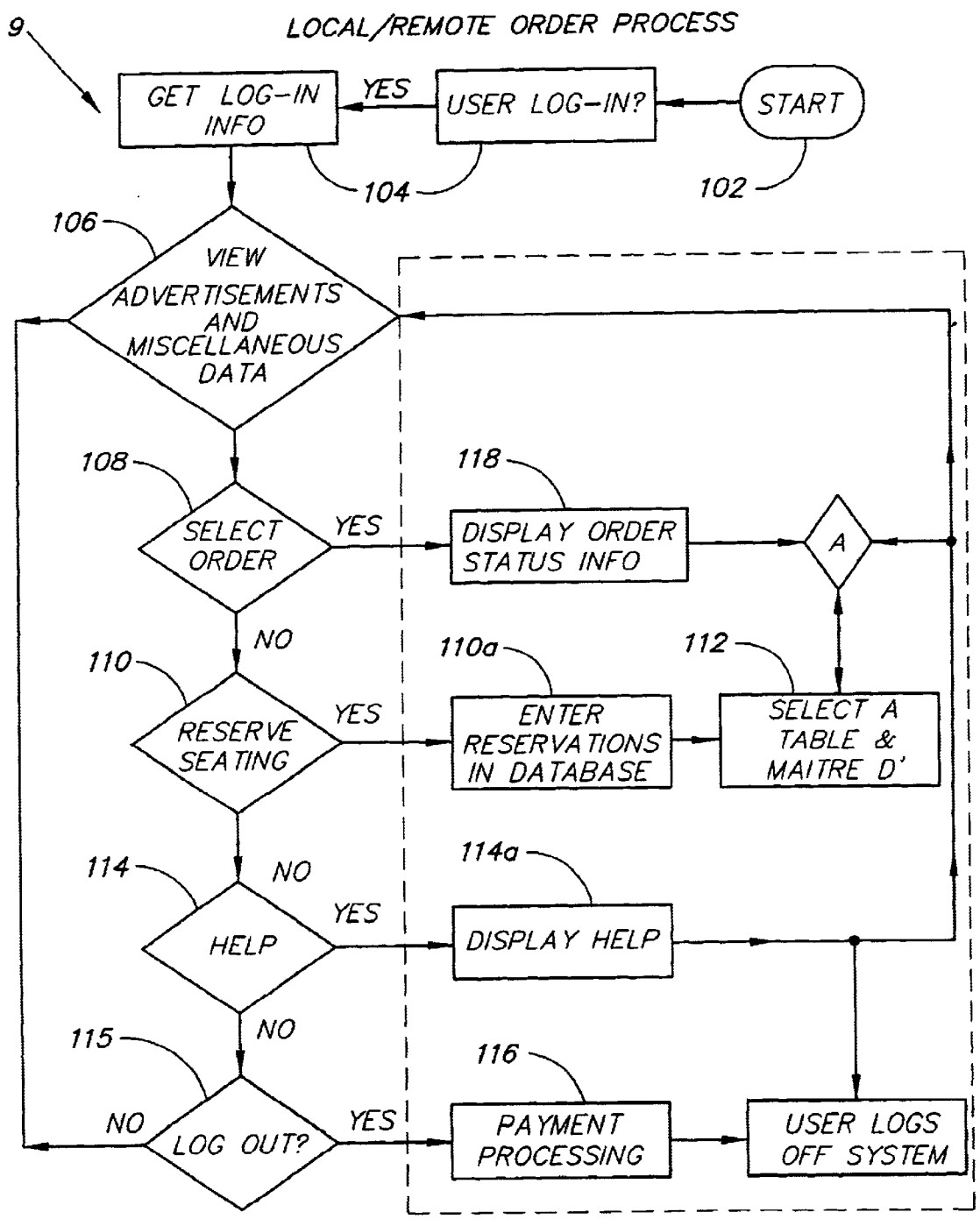
FIG. 5B is a flow diagram of the local and remote ordering process for the wireless maitre d' system according to the invention.
Figure 5C:
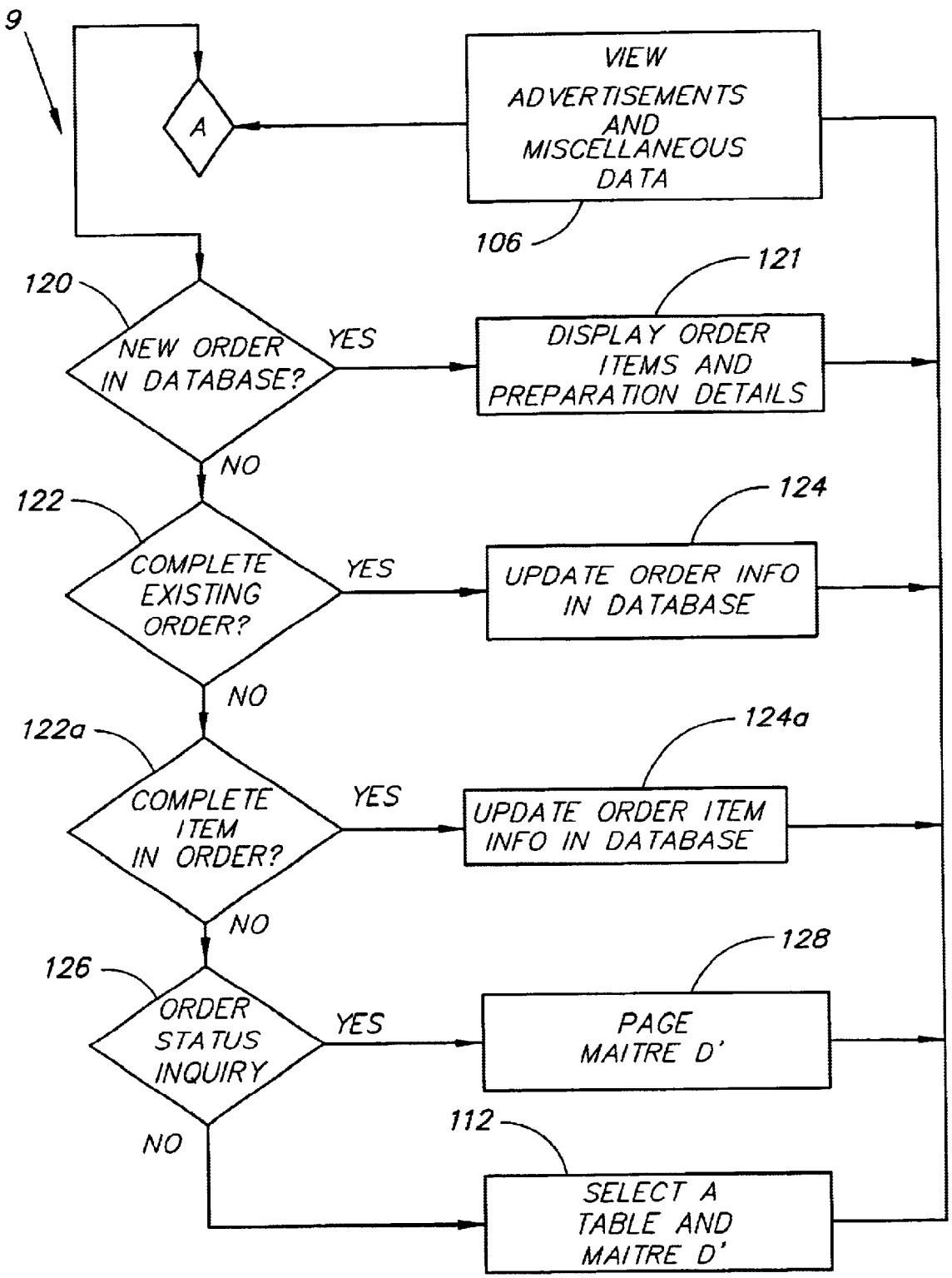
FIG. 5C is an expanded branch of the flow diagram of FIG. 5B illustrating a flow diagram for making new orders and paging a selective maitre d' according to the invention.

As diagrammatically illustrated in FIGS. 5B and 5C, a method 9 for providing wireless maitre d' ordering service in restaurants, utilizing the maitre d' system 8 according to the invention is shown having the general steps of:

(a) logging (102) into the service by getting log-in information;

(b) inputting personal data (104) (i.e. name, address, etc.);

(c) selecting advertisements and miscellaneous data (106);

(d) selecting menu order information (108);

(e) reserving selective seating (110) and entering reservations in a database (110*a*);

(f) selecting a maitre d' (112);

(g) selecting help (114) and displaying help features (114*a;*

(h) logging out (115) with final payment processing (116). Remote call in log-in features can include the option wherein the log in step (a) includes activating a voice messaging system for remote menu orders. The inputting step (b) includes inputting data such as name, sex, age, zip code and a socio-economic level indicator such as an annual salary value. Once this data is input by the patron, the data is compiled according to the group of parameters consisting of name, sex, age, zip code and the socio-economic level indicator. This compiled data can be performed as a dormant background calculation selectively group to illustrate various trends or can be generated in real-time to reflect patron comparisons based on the input parameters to reflect restaurant culture or other trend related information to attract customers or improve marketing.

Subsequently, the user or patron P is logged into the main system and has the option of viewing several menu items. As noted in step (c), the patron selects a menu group of advertisements and miscellaneous data. This step further includes the following steps of:

(c1) selecting a description of a selective advertisement;
(c2) selecting catering;
(c3) selecting for sale products in restaurant;
(c4) selecting job information opportunities;
(c5) selecting on-line games of various sorts;
(c6) selecting trivia health questions taken from any number of references, including encyclopedias, medical journals, etc.;
(c8) selecting toll free call/paging, which will activate a direct link to the internet, with link options for selecting from among a group web calling or paging sites. The menu as recited above will be menu driven system which utilizes linked images. Therefore, the selecting step (d) for menu order information according to the wireless method 9 for providing wireless maitre d' service in restaurants includes wherein the selecting step (d) further includes the steps of:
(d1) selecting from a set of preselected photo-realistic images representative of particular restaurants menu of selective food items, and including at least one touch activated organ symbol for visually indicating health related benefits for personal nutritional needs;
(d2) displaying order status (118); if there is no new order required (120), the patron will take step (d2)(a) to complete an existing order (122); including the option of (d2) (b) updating order information (124). The other condition being having to make a new order by selecting the step of (d3) selecting a new order (120) and (d3) (a) displaying order items and preparation details (121) and subsequently completing the new order by taking step d3)(b) to completing an existing order (122). To change a single item in a order the patron select the step 122a to complete item change in order and to update the order change 124a or to to make and order status inquiry (126). Whether completed during the selective seat and table step, the patron P, would later have the option of step (f) selecting a maitre d' (112) as a cross-linked menu feature, based on four relative quality factors such as:
(1) personal profile;
(2) hobbies;
(3) professional health related skills; and
(4) mobile page device number. Where the last quality factor includes the step embodying the critical features of (d5) paging the selected maitre d'(128). This step can include help features which include:
(g1) indicating a medical emergency;
(g2) requesting assistance with order;
(g3) activating a demo of the system;
(g4) requesting service for:
(a) selective condiments;
(b) selective utensils;
(c) selective beverages; and
(d) selective sweeteners.

Figure 6:
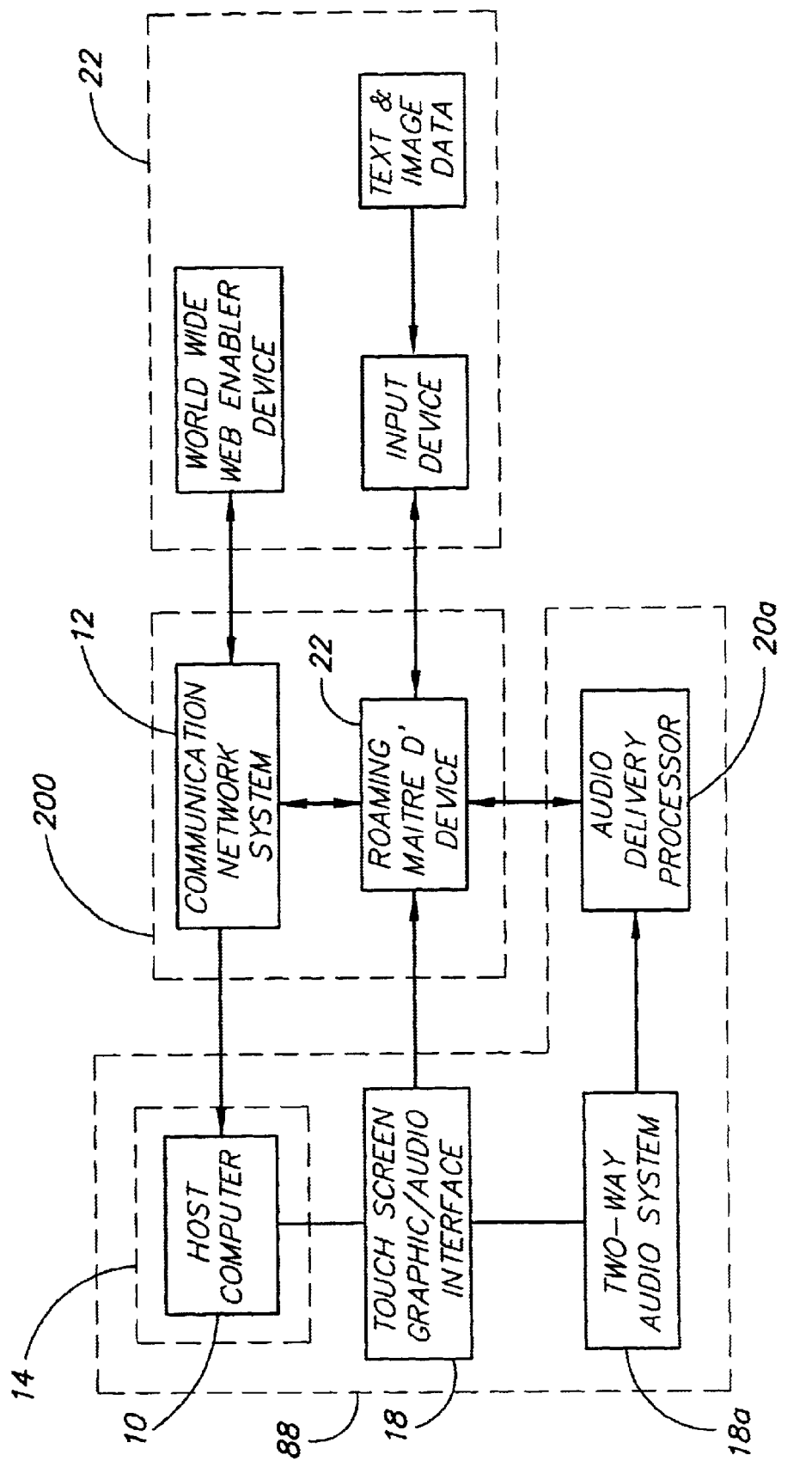
FIG. 6 is a system block diagram of the maitre d' system according to the invention, illustrating interconnected hardware components for implementing the system.

As diagrammatically illustrated in FIGS. 6–7B, the wireless maitre d' system network is shown for electronically filling and correcting menu orders in and outside of restaurants for a plurality of patrons and waiter combinations. In this system a number of waiters will have a numbers of patrons or tables assign to them as a regional set-up described above. Within this network, a plurality of 2-way interactive communication can take place to fill and correct menu orders by the patrons. As an optional feature the waitress can set a patrons touch screen features for direct connections with the kitchen chef as a special accommodation for regular customers. According to FIG. 6, the network of the system is shown comprising a wireless transmitter or transceiver module 200 electronically connected to a computer host or server 10. The server 10 has at least one data storage means 14, at least one video monitor 18 electrically connected to the host computer 10 and a computer readable code means identified by FIGS. 7A and 7B by which a plurality of patrons P transmit 2-way interactive wireless data between at least one menu driven touch screen or video monitor 18 (and electrically connected computer system or host 10) via compatible computer and software related devices or web enabled devices 22 within or outside a local and/or wide-band area network. Both FIGS. 7A and 7B describe a three-step process 202 and 204, respectively of sending pages to or from a remote web enabled device. With a universal pin number, the patron P can access the maitre d' system by pager from a remote location or as a local patron in a restaurant with the option of contacting a remote friend or family member by page. This paging feature presumes the use of compatible MCI and/or AT&T devices. In either case, such paging features are well known in the art. Accordingly, the menu driven touch screen monitor 18 according to the network would comprise a menu program resident with the host computer 10 which allows patrons P to make visual orders and send messages to at least one restaurant employee being in possession with at least one of at least one 2-way interactive communication device.

The menu program also includes a set of selective photo-realistic images digitally accessible via at least one storage means or facility 14 of the computer server 10. An augmented program of readable source code can be incorporated as an option to include interactively promotional menu items which link caloric expenditure data and health related information to organ symbols as visually indicators related to personal health conditions.

The noted health related advantages of the instant invention are in that the kiosk system and menus thereof allow a user to review menu items linked to caloric expenditure data and health related information approved by the American Heart Association (AHA) and the American Diabetic Association (ADA). Other advantages include options wherein touch screen monitors are configured with braille and/or voice activated capability to instruct in various foreign languages for those who are visually impaired or accustomed to speaking only a native or indigenous tongue to enable similar access and compatible use with the maitre d' system as herein disclosed.

It is to be understood that the present invention is not limited to the embodiments described above, but encompasses any and all embodiments within the scope of the following claims.

We claim:

1. A wireless maitre d' system for providing interactive two-way electronic communication between patrons and restaurant service personnel who have direct interaction with the patrons during restaurant encounters, said wireless maitre d' system comprising:

first wireless means for establishing an interactive two-way electronic communication between at least one patron and at least one restaurant service personnel by a wireless communication link, the at least one restaurant service personnel directly interacting with the at least one patron during a restaurant encounter, and second wireless means for engaging in the interactive two-way electronic communication between the at least one service personnel and the at least one patron by the wireless communication link, wherein the interactive two-way electronic communication includes an order for a retail item from the at least one patron to the at least one restaurant service personnel.

2. The wireless maitre d' system according to claim 1, wherein said first wireless means comprises a menu driven touch screen communicatively interconnected with a menu program residing in a memory of a computer, the menu program being configured for enabling said at least one patron to make visual orders and send messages to said at least one restaurant service personnel via said second wireless means.

3. The wireless maitre d' system according to claim 2, wherein the menu program is further configured for digitally accessing a set of selective photo-realistic images from the memory of the computer.

4. The wireless maitre d' system according to claim 3, further comprising a stand alone kiosk means for attracting roaming patrons and for providing menu order vouchers therefrom.

5. The wireless maitre d' system according to claim 4, wherein said kiosk means comprises an augmented program of readable source code configured for enabling a user to interactively review menu items linked to caloric expenditure data and health related information, the data and information being interactively linked to an organ symbol for visually indicating personal health related items.

6. The wireless maitre d' system according to claim 1, wherein said second wireless means is a hand-held palm size pager unit having a display and being equipped with multi-line scrolling and buffer capabilities for sending interactive page signals.

7. The wireless maitre d' system according to claim 6, wherein said pager unit is configured with attaching means for attaching to a user for hands-free use.

8. A wireless maitre d' system network for providing interactive two-way electronic communication between patrons and restaurant service personnel who have direct interaction with the patrons during restaurant encounters, said wireless maitre d' system network comprising:

at least one first wireless means for establishing an interactive two-way communication between at least one patron and at least one restaurant service personnel by a wireless communication link, the at least one restaurant service personnel directly interacting with the at least one patron during a restaurant encounter, the interactive two-way electronic communication including an order for a retail item from the at least one patron to the at least one restaurant service personnel;

at least one second wireless means for engaging in the two-way communication between the at least one restaurant service personnel and at the least one patron with the second wireless means by the wireless communication link; and a stand alone kiosk means for attracting roaming patrons and for providing menu order vouchers therefrom, said kiosk means comprising an augmented program of readable source code configured for enabling a user to interactively review menu items linked to caloric expenditure data and health related information, the data and information being interactively linked to an organ symbol for visually indicating personal health related items;

wherein said at least one first wireless means comprises a menu driven touch screen communicatively interconnected with a menu program residing in a memory of a computer, the menu program being configured for enabling said at least one patron to make visual orders and send messages to said at least one restaurant service personnel via said second wireless means, and being configured for digitally accessing a set of selective photo-realistic images from the memory of the computer;

said at least one second wireless means is a hand-held palm size pager unit having a display means and equipped with multi-line scrolling and buffer capabilities for sending interactive pages, the pager unit being configured with attaching means for attaching to a user for hands-free use; and the network is a local area network.

9. The method for providing wireless maitre d' service according to claim 8, said method further comprising:

logging into a service;

inputting personal data;

selecting advertisements and miscellaneous data;

selecting menu order information;

reserving selective seating;

selecting a maitre d';

selecting help; and logging out by patron payment processing.

10. The method for providing wireless maitre d' service according to claim 9, wherein the logging into a service step further comprises:

activating a voice messaging system for remote menu orders.

11. The method for providing wireless maitre d' service according to claim 9, wherein the inputting personal data step further comprises inputting name, sex, age, zip code, and a soda-economic level indicator, said indicator being an annual salary value.

12. The method for providing wireless maitre d' service according to claim 11, wherein the inputting personal data step further comprises:

compiling data according to a group of parameters consisting of name, sex, age, zip code, and the socio-economic level indicator.

13. The method f or providing wireless maitre d' service according to claim 9, wherein the selecting advertisements and miscellaneous data step further comprises:

selecting a description of a selective advertisement;

selecting catering;

selecting for sale products in restaurant;

selecting job information opportunities;

selecting on-line games;

selecting trivia health questions; and selecting toll free call/paging.

14. The method for providing wireless maitre d' service according to claim 9, wherein the selecting menu order information step further comprises:

selecting from a set of preselected photo-realistic images representative of particular restaurants menu of selective food items, the set including at least one touch activated organ symbol for visually indicating health related benefits for personal nutritional needs;

displaying order status;

selecting a new order; and selecting a maitre d'.

15. The method for providing wireless maitre d' service according to claim 14, wherein the displaying order status step further comprises:

completing an existing order; and updating order information.

16. The method for providing wireless maitre d' service according to claim 14, wherein the selecting a new order step further comprises:

displaying order items and preparation details; and completing an existing order.

17. The method for providing wireless maitre d' service according to claim 14, further comprising:

paging the selected maitre d'.

18. The method for providing wireless maitre d' service according to claim 9, wherein the maitre d' selecting step further comprises:

selecting based on a personal profile;

selecting based on hobbies;

selecting based on professional health related skills; and selecting based on a mobile page device number.

19. The method for providing wireless maitre d' service according to claim 9, wherein the selecting help step further comprises:

indicating a medical emergency;

requesting assistance with order;

activating a demo of the system;

requesting service for condiments;

requesting service for utensils;

requesting service for beverages; and requesting service for sweeteners.

20. A method for providing wireless maitre d' service in a restaurant, said method comprising:

establishing an interactive two-way communication between at least one patron and at least one restaurant service personnel with a first wireless means by a wireless communication link, the at least one restaurant service personnel directly interacting with the at least one patron, and engaging in the interactive two-way communication between the at least one service personnel and the at least one patron with a second wireless means by the wireless communication link, the at least one service personnel directly interacting with the at least one patron, wherein the interactive two-way communication includes an order for a retail item from the at least one patron to the at least one restaurant service personnel.

* * * * *